March 24, 1936.  F. L. FOX  2,035,060
GAS COOKING STOVE
Filed March 10, 1934   3 Sheets-Sheet 2
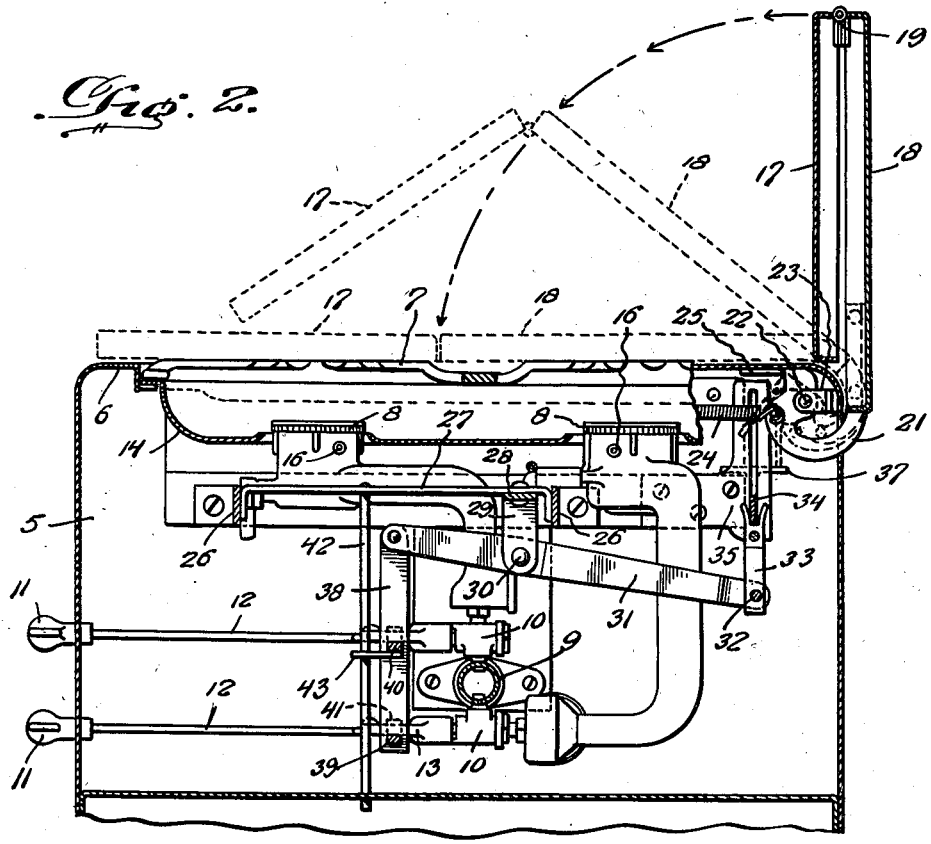
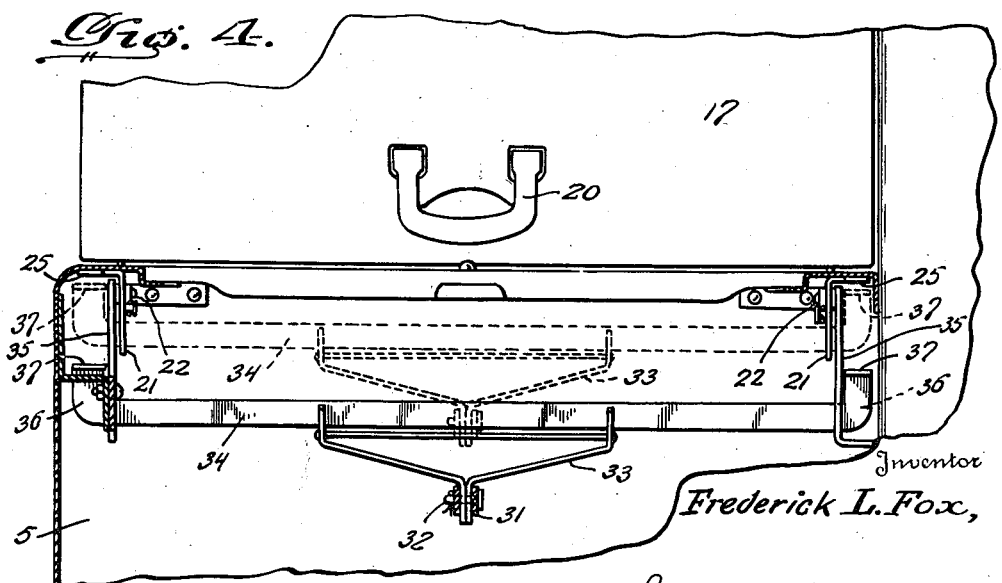
Inventor
Frederick L. Fox,
By J. Stanley Bunch
Attorney March 24, 1936.                F. L. FOX                    2,035,060
                          GAS COOKING STOVE
                        Filed March 10, 1934            3 Sheets-Sheet 3

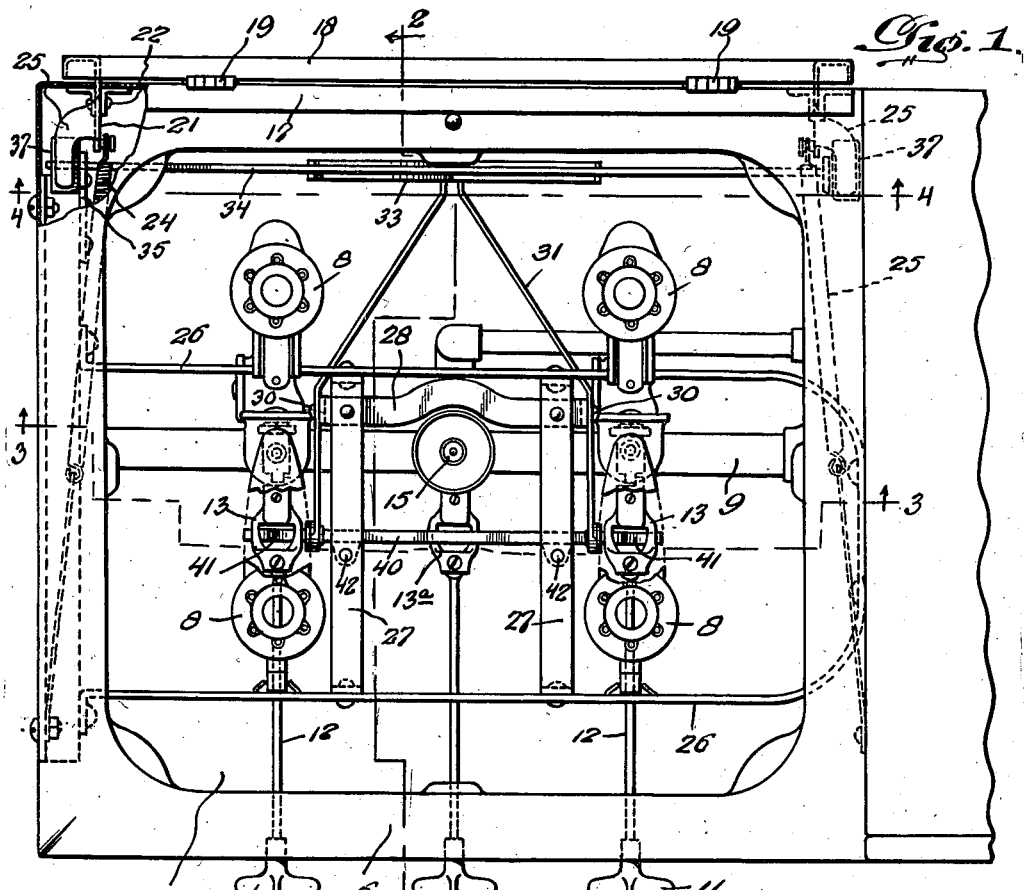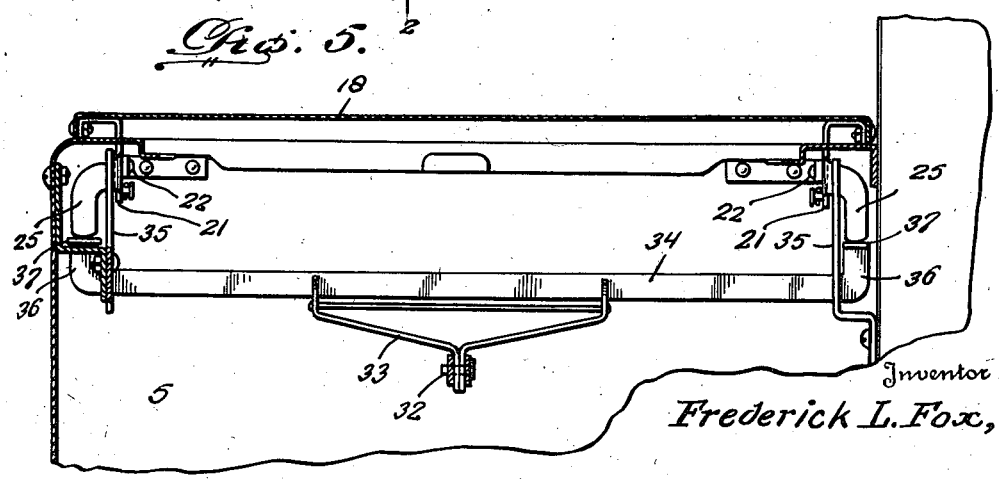

Inventor
Frederick L. Fox,

By J. Stanley Burch
                    Attorney

Patented Mar. 24, 1936

2,035,060

UNITED STATES PATENT OFFICE 2,035,060

GAS COOKING STOVE

Frederick L. Fox, Washington, D. C.

Application March 10, 1934, Serial No. 715,008

9 Claims. (Cl. 126—42)

This invention relates to gas and other cooking stoves of the cabinet type in which a cover is used to conceal the burner top when the stove is not in use for cooking purposes, whereby the stove at such times presents the appearance of a cabinet or table.

In gas stoves of the above type now in extensive use, means including a pilot burner is usually provided for automatically lighting any one or more of the burners when the gas control valve or valves of the latter is or are opened. Thus, should the gas control valve of a burner be opened while the burner top cover is in place or positioned to conceal the burner top, that burner would be lighted and the cover would be subjected to the heat and destructive action of the flame of the lighted burner. Obviously, such an occurrence would quickly result in marring the appearance of the cover and even ruining of the same. The same objectionable results would be experienced if the cover were moved to closed position for concealing the burner top while one or more of the burners were left burning, through oversight or otherwise. In practice, lighting of one or more of the burners has often occurred with the cover in place, because of tampering with the stove on the part of irresponsible persons or children.

It is therefore the primary object of the present invention to prevent objectionable occurrences of the kind first-mentioned above, and to thereby prevent the consequent damage to or ruination of the burner top cover of a cooking stove, by the provision of means associated with the cover for preventing the burners from being turned on when the cover is in burner top concealing position.

A further object of the present invention is to provide means whereby the control elements for stove burners are automatically released for being freely operated when the burner top cover is moved to uncover and expose the burner top and burners.

A still further object of the present invention is to provide means which will not only prevent opening of the burner control elements when the cover is in concealing position, but which will also effect turning off of any of such elements should they happen to be turned on, when the cover is moved to concealing position.

Still another object of the present invention is to provide means of the character specified above which shall be extremely simple and durable in construction, efficient in operation, and capable of ready installation upon the stove either during or subsequent to manufacture thereof.

With the above general objects in view, and others that will become apparent as the nature of the invention is better understood, the same consists in the novel form, combination and arrangement of parts hereinafter more fully described, shown in the accompanying drawings and claimed.

In the drawings:

Figure 1 is fragmentary top plan view of a gas cooking stove equipped with a valve actuating and locking mechanism or device constructed in accordance with the present invention, parts of the stove being omitted for sake of clearness, and other parts being broken away and in section to reveal details.

Figure 2 is a fragmentary vertical section taken substantially upon the plane indicated by the line 2—2 in Figure 1.

Figure 3 is a fragmentary vertical section on line 3—3 of Figure 1.

Figure 4 is a fragmentary vertical section on line 4—4 of Figure 1.

Figure 5 is a view similar to Figure 4 with the cover moved to concealing position; and Figure 6 is an enlarged fragmentary view of the construction illustrated in Figure 3, with one of the burner control valves open, and with parts moved to the position in which they are shifted by opening of such valve.

An embodiment of the present invention is shown in the drawings by way of example as applied to a conventional type of gas cooking stove now in general use, wherein the burner top cover is of the hinged type and composed of hingedly connected sections and adapted to fold into compact condition when moved to uncover the burner top and burners. However, it is to be understood that the invention can be readily adapted to various kinds and types of stove constructions, and the invention accordingly resides, in its broadest aspect, in simply providing a certain cooperative relation between means for controlling the burners of a cooking stove and a cover for the burner top of said stove, the cover being movable to either cover or uncover the burner top and burners.

In the embodiment shown, the stove has an upper burner box or compartment 5 provided with the burner top 6 including the usual grilles 7. Located in the compartment 5 below the burner top are the usual gas burners 8 supplied with gas by a manifold 9, the supply of fuel to each burner being controlled by a valve 10 provided with a handle located outside the compartment 5 at the front of the latter. In this particular type of construction, the valves 10 have rotatable valve members coaxial with the stems 12 of the handles 11, said stems extending through the front wall of compartment 5 and being coupled at their inner ends with the respective valve stems by means of yoke-shaped coupling members 13. Removably suspended from the burner top 6 beneath the grilles 7 and in surrounding relation to the burners 8 is a drip pan 14. The burners 8 are uniformly spaced about a pilot burner 15 supplied with gas by the manifold 9 and forming part of means for automatically lighting any one or more of the burners 8 when the gas control valve or valves of the latter is or are opened. In the particular type of stove illustrated, this automatic burner lighting means consists of passages, not shown, formed in the drip pan 14 and leading from side gas escape ports 16 of the burners 8 to the pilot burner 15, whereby, upon turning on the gas to any one of the burners 8, a jet of gas will be directed from that burner through its side port 16 and the associated passage of drip pan 14 to the pilot burner 15 for being ignited by the latter. This ignited lateral jet of gas in turn lights the burner itself and maintains it lighted as long as gas is supplied thereto, or until the control valve of such burner is closed. The construction illustrated further includes a cover for the burner top and burners composed of foldable hingedly connected sections 17 and 18 whose hinge connection is indicated at 19. The forward section 17 of this cover has a suitable handle 20, while the rear section 18 is hinged at its rear corners to the body of the stove for vertical swinging movement. For the latter purpose, arcuate hinge members 21 are carried by the cover section 18 and arranged to move through slots in the rear wall of compartment 5, the inner ends of the hinge members 21 being pivoted at 22 to hinge brackets 23 rigidly attached to the rear wall of compartment 5 within the latter and adjacent the burner top 6. Tension springs 24 are connected to the hinge members 21 so as to counterbalance the cover and promote its easy and noiseless movement when shifted from the raised or open full line position of Figure 2 to the lowered or closed and completely unfolded position as indicated by dotted lines in the same figure, or vice versa. The hinge members 21 have lateral lugs or extensions 25 arranged to engage the burner top 6 for limiting raising of the cover to a substantially vertical open position as shown by full lines in Figure 2. A horizontal supporting frame 26 of U-shape is mounted in the compartment 5 beneath the burner top 6 for supporting the burners 8, and the legs of this frame 26 are connected by spaced brace bars 27. Thus far described, the stove is of conventional construction, and it will be seen that the cover may be unfolded and lowered so as to conceal the burner top and serve as a table top when the stove is not in use for cooking purposes, said cover being adapted to be readily raised and folded so as to uncover the burner top and permit the stove to be used for cooking purposes. It will further be apparent that with this conventional construction, no provision is made for preventing opening of the valves 10 and lighting of the burners 8 when the cover is in closed position, and no means is provided to prevent closing of the cover while any one or more of the burners 8 are lighted. Even if the automatic lighting means for the burners 8 were omitted, the valves 10 could be opened with the cover closed, which would result in dangerous accumulation of gas within the burner box or compartment 5. Obviously, with a burner lighted and the cover closed, such cover will be subjected to the flame of the lighted burner so as to be dangerously heated and with the result that the finish of the cover is quickly marred to render its appearance unsightly. In fact, continuance of this occurrence might even ultimately result in utter ruination of the cover itself.

As before stated, therefore, the present invention aims to provide means to positively prevent lighting of the burners 8 when the cover is closed, to prevent turning on the gas to the burners 8 when the cover is closed, and to make it absolutely impossible to leave one or more of the burners lighted when the cover is closed. In the illustrated embodiment of the invention, the brace bars 27 are connected near their rear ends by a cross bar 28 having down turned ends 29, and pivoted intermediate its ends at 30 to each down turned end 29 is a vertically swinging lever 31. The levers 31 are of similar form and converge at their rear ends where they are pivoted at 32 to the bottom of a substantially U-shape yoke 33 whose spaced upper ends are provided with slots in which are received a transverse bar 34. The transverse bar 34 is guided for vertical sliding movement in vertically slotted brackets 35 rigidly mounted in the upper rear portion of compartment 5 directly in front of the hinge connections between the burner top cover and the body of the stove. As shown, the transverse bar 34 projects outwardly through the slots of brackets 35 where it terminates in upturned ends 36 having horizontal flanges 37. The arrangement is such that the flanges 37 are arranged in the path of the stop lugs 25 of hinge members 21, so that when the cover is unfolded and swung down to closed position, the stop lugs 25 will bear upon the flanges 37 and cause the transverse bar 34 to be depressed. This causes downward movement of yoke 33 and the rear ends of levers 31 to which said yoke is connected, with corresponding upward movement of the forward ends of levers 31. It will also be seen that when the cover is raised or opened, the stop lugs 25 will move away from flanges 37 so as to release the bar 34 and permit upward movement of the latter and yoke 33, as well as swinging movement of levers 31 in an opposite direction.

Figures 3, 6:
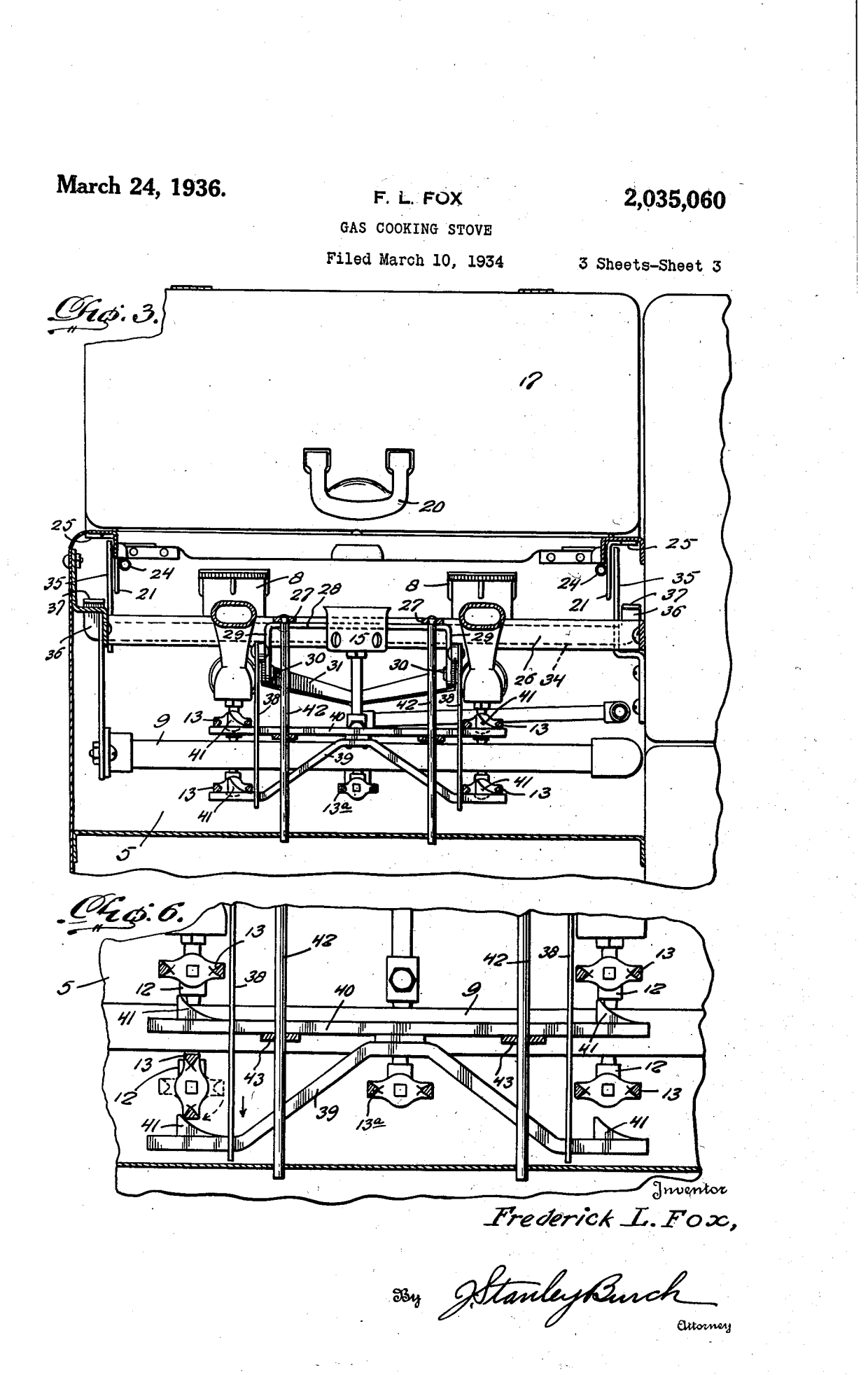

Pivoted to and depending from the forward ends of levers 31 are spaced bars 38 rigidly connected by spaced superposed cross bars 39 and 40 whose ends project laterally beyond the outer sides of the depending bars 38 where they are provided on their upper sides with cam lugs 41 having arcuate upper cam faces. The arrangement is such that a cam lug 41 is arranged directly beneath each of the yokes 13 connecting the stems 12 of handles 13 with the stems of the burner control valves 10, each cam lug 41 being positioned to enter the adjacent yoke 13 when the cross bars 39 and 40 are elevated to the extent caused through the connections described by depression of transverse bar 34 when the cover is lowered or closed. It will be noted that when the cam lugs 41 enter the yokes 13, the adjacent ends of cross bars 39 and 40 flatly engage the underside of yokes 13 as shown in Figure 3 to hold them against turning and in the horizontal positions which they assume when the burner control valves 10 are closed. With this arrangement, it is impossible to turn and open the valves 10 by operation of handles 11 when the cover 17, 18 is closed. This will be appreciated when it is noted that at such time the stop lugs 25 are lowered and vertically positioned in engagement with the flanges 37 of transverse bar 34 as shown by full lines in Figure 5 and by dotted lines in Figure 2, thereby holding the transverse bar 34 depressed and preventing movement of levers 31 and the vertical bars 38 carrying the cross bars 39 and 40. Thus, the invention effectively provides for preventing opening of valves 10 when the cover for the burner top is lowered or closed, so that the gas cannot be turned on to said burners and said burners cannot be lighted when said cover is closed. On the other hand, when the cover is raised or opened, the stop lugs 25 are disengaged from the flanges 37 of transverse bar 34 so that the latter is released and free upward movement thereof permitted. Under the latter circumstance, it will be apparent that no material resistance is offered to turning of yokes 13 by means of handles 11 and consequent opening of valves 10 for turning on the gas to and lighting the burners 8. In fact, the yokes 13 afford arms engageable with the cam faces of lugs 41 for depressing the bars 39 and 40 and parts movable therewith when the transverse bar 34 is released by opening of the cover. While the operative connection between transverse bar 34 and yoke 13 may be weighted so as to be substantially counterbalanced, weight or spring means might be readily provided to normally yieldingly exert an upward pull on the rear ends of levers 31 so as to cause upward movement of transverse bar 34 and yoke 33 and downward movement of bars 38 and parts carried thereby when the cover is opened. While a counterbalanced construction will offer little resistance to turning of valves 10 when the cover is open, the provision of such weight or spring means would even eliminate this slight resistance.

It will be further noted that the construction provides means for closing any one of the valves 10 which might be open when the cover is closed, and to thereby turn off any burner which may be lighted at that time. For instance, the lower left hand yoke 13 in Figure 6 is shown turned to a position wherein the associated valve 10 is open, and it may be assumed that the burner controlled by this valve is lighted. With this position of parts, the cover is of course open, and upon closing the cover the transverse bar 34 will be depressed so as to swing levers 31 in a direction to pull upwardly on the bars 38 and raise the bars 39 and 40. When this takes place, the cam lug 41 associated with the lower left-hand yoke 13 will engage the adjacent arm provided by such yoke and force the same to the right and upwardly so that when the bar 39 reaches its raised position of Figure 3, the said lower left hand yoke 13 will have been turned to the dotted line horizontal position of Figure 6 and the associated control valve 10 will have been closed. Thus, any lighted burner is automatically turned out, when the cover is closed, by means of the mechanism described.

In order to keep the cam lugs 41 in operative relation to yokes 13, the unit composed of bars 38, 39 and 40 is guided in its vertical movement by means of spaced vertical guide rods 42 fastened at their upper ends to the brace bars 27 and projecting slightly at their lower ends through openings in the bottom wall of compartment 5, the guide rods 42 extending freely through openings in forwardly projecting guide brackets or plates 43 rigid with the cross bar 40.

It so happens that in the type of stove construction illustrated, the operating handle of the control valve for an oven burner is arranged with its yoke 13a intermediate the lower yokes 13 as shown in Figures 1 and 6, and in order that this yoke 13a may not interfere with vertical movement of cross bar 39, the intermediate portion of the latter is arched upwardly and rigidly connected to the intermediate portion of cross bar 40 for purposes of rigidity of the valve actuating and locking unit 38, 39 and 40.

From the foregoing description, it will be seen that the present invention provides a simple, durable and efficient means for carrying out the stated objects. It will be further seen that the device may be readily installed upon stoves either during or subsequent to manufacture and at little additional cost. More particularly, a mechanic in possession of the essential characteristics and features of the invention might readily adapt the same to stoves of various types and specific constructions, and it is to be understood that such adaptations are considered to come within the spirit and scope of the invention as claimed.

What I claim as new is:

1. In a gas cooking stove, an upper burner box or compartment having a burner top, a plurality of gas burners located in said compartment below the burner top, manually operable valves for controlling the flow of gas to the respective burners, a movable unit for closing said valves when moved to one position and capable of preventing opening of said valves if held in such position, a cover for said burner top movable to burner concealing or revealing positions, and means actuated by said cover for moving said unit to and holding the same in such position when the cover is moved to concealing position, the operating means for each valve including a member providing an arm, and said unit including members operatively associated with said arms for effecting the closing movement of the valves when the unit is so moved.

2. In a gas cooking stove, an upper burner box or compartment having a burner top, a plurality of gas burners located in said compartment below the burner top, manually operable valves for controlling the flow of gas to the respective burners, a vertically movable unit for closing said valves when moved upwardly and capable of preventing opening of said valves if held in its upward position, a cover for said burner top movable to burner concealing or revealing positions, means actuated by said cover for moving said unit upwardly and holding the same in its upward position when the cover is moved to concealing position, and means for guiding said unit in its vertical movements.

3. In a gas cooking stove, an upper burner box or compartment having a burner top, a plurality of gas burners located in said compartment below the burner top, manually operable valves for controlling the flow of gas to the respective burners, a vertically movable unit for closing said valves when moved upwardly and capable of preventing opening of said valves if held in its upward position, a cover for said burner top movable to burner concealing or revealing positions, means actuated by said cover for moving said unit upwardly and holding the same in its upward position when the cover is moved to concealing position, said means operated by the cover including vertically swinging levers connected to said unit at one end, a depressible bar operatively associated with the other ends of said levers, and means movable with the cover and engageable with said bar for depressing the latter when the cover is moved to concealing position.

4. In a gas cooking stove, an upper burner box or compartment having a burner top, a plurality of gas burners located in said compartment below the burner top, manually operable valves for controlling the flow of gas to the respective burners, a vertically movable unit for closing said valves when moved upwardly and capable of preventing opening of said valves if held in its upward position, a cover for said burner top movable to burner concealing or revealing positions, means actuated by said cover for moving said unit upwardly and holding the same in its upward position when the cover is moved to concealing position, said means operated by the cover including vertically swinging levers connected to said unit at one end, a depressible bar operatively associated with the other ends of said lever, and means movable with the cover and engageable with said bar for depressing the latter when the cover is moved to concealing position, said last-named means comprising stop lugs for limiting the cover in its movement to revealing position and movable away from the depressible bar when the cover is moved to the latter position so as to release the levers and unit and permit free manual actuation of the control valves.

5. In a gas cooking stove, the combination with an upper burner box or compartment having a burner top, a plurality of burners located in said burner box or compartment below the burner top, valves in said burner box or compartment for controlling the flow of gas to the respective burners, said valves having handles located outside said burner box or compartment, and a cover for said burner top movable to burner concealing or revealing positions, of means completely within said burner box or compartment and operable by said burner top cover for securing said control valves in closed position when said cover is moved to burner concealing position.

6. In a gas cooking stove, the combination with an upper burner box or compartment having a burner top, a plurality of burners located in said burner box or compartment below the burner top, valves in said burner box or compartment for controlling the flow of gas to the respective burners, said valves having handles located outside said burner box or compartment, and a cover for said burner top movable to burner concealing or revealing positions, of means completely within said burner box or compartment and operable by said burner top cover for closing any one or more of said control valves that may be open when said cover is moved to burner concealing position.

7. In a gas cooking stove, the combination with an upper burner box or compartment having a burner top, a plurality of burners located in said burner box or compartment below the burner top, valves in said burner box or compartment for controlling the flow of gas to the respective burners, said valves having operating handles located outside the burner box or compartment, and a cover for said burner top movable to burner concealing or revealing positions, of means operable by said burner top cover for closing said valves when said cover is moved to burner concealing position, said valve closing means including operating stems for the valves provided with arms within the burner box or compartment and a unit movably mounted within said burner box or compartment and operating on said arms.

8. In a cooking stove, the combination with an upper burner box or compartment having a burner top, a plurality of burners associated with the burner top, manually operable elements in said burner box or compartment for controlling the respective burners, said manually operable elements having operating handles located outside said burner box or compartment, and a cover for said burner top movable to burner concealing or revealing positions, of means completely within said burner box or compartment and operable by said burner top cover for moving said control elements to off position when said cover is moved to burner concealing position.

9. In a gas cooking stove, an upper burner box or compartment having a burner top, a plurality of gas burners located in said compartment below the burner top, valves for controlling the flow of gas to the respective burners, means including handles outside the burner box or compartment for manually operating said valves, a cover for said burner top movable to burner concealing or revealing positions, a unit for closing said valves when moved to one position and capable of preventing opening of said valves if held in such position, and means actuated by said cover for moving said unit to and holding the same in such position when the cover is moved to concealing position, the means for manually operating each valve including a member providing an arm, and said unit including members operatively associated with said arms for effecting the closing movement of the valves when the unit is so moved.

FREDERICK L. FOX.